May 7, 1968     G. W. STANWICK     3,381,733
THREAD FORM
Filed July 1, 1966
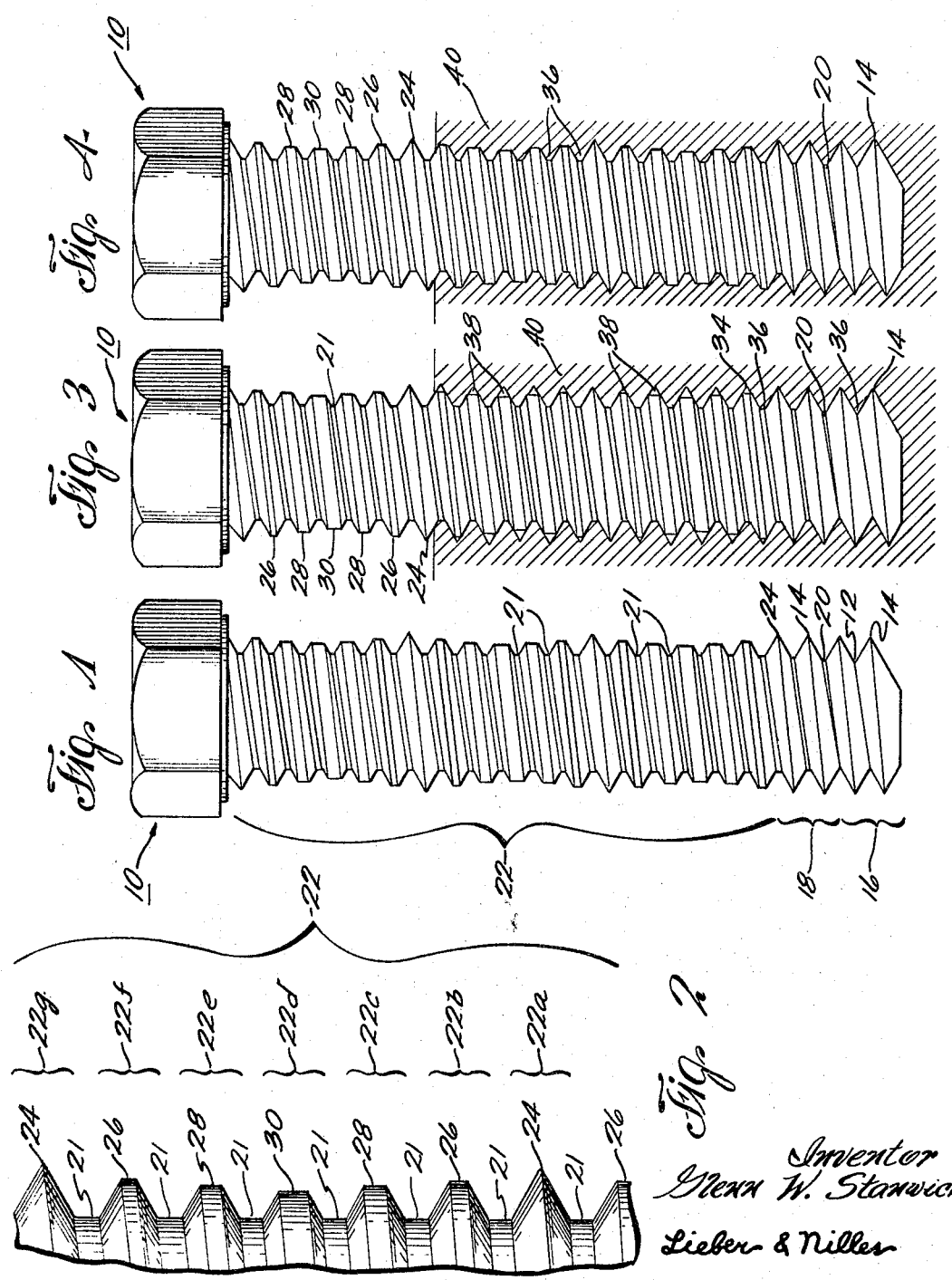

United States Patent Office 3,381,733
Patented May 7, 1968

3,381,733
THREAD FORM
Glenn W. Stanwick, 1325 Valley Ridge Drive,
Brookfield, Wis. 53005
Filed July 1, 1966, Ser. No. 562,371
6 Claims. (Cl. 151—22)

ABSTRACT OF THE DISCLOSURE

A male thread form which, especially under conditions of repeated shocks or vibrations, resists removal from the female thread form into which it is inserted, the resistance to removal being effected by variations in the crest and root diameters of the thread throughout the length of the stud or other male member.

Background

In uniting or mounting machines, such as propulsion engines, or parts thereof, it is frequently necessary or, at least, highly desirable to provide a removal resistance or locking means to the studs, bolts, or other threaded members used to assemble the same. In some cases, special locking nuts or lock washers may be used, but in many instances, the use of these separate devices is either impractical or impossible. Attempts have accordingly been made to incorporate a locking means directly in the screw threads of threaded members so as to provide removal resistance thereto.

In general, such locking means for threaded members have developed along two lines. One such locking means incorporates a deformation in the male threaded member which is adapted to engage the female threaded member and frictionally lock the members together. For example, in one device the male member is provided with spaced locking projections on the inclined faces of the threads which lock the male member to the female member. However, the formation of the locking projections is not possible by a standard thread rolling or cutting operation, and it is therefore necessary to effect the deformation by an additional separate milling operation. The cost is accordingly prohibitive. Furthermore, the projections on the male thread tear and multilate the thread on the female member and thus weaken the holding power.

Another prior attempt to incorporate locking or holding means directly in the male thread is known wherein the root diameter of the thread of the male member is increased in an interrupted fashion to provide a knurled effect. However, the tooling required for forming the thread of this device is again highly unusual and production costs are excessive, and furthermore, the knurled root of the male thread likewise causes tearing and mutilation of the thread of the female member and resultant objectionable loss of holding power.

The other general type of removal resistance or locking means provides for an interference between the mating threads, either by making the flanks of the two thread forms relatively divergent, or by thickening or widening the crest or root of one of the members relative to the other, while providing a void for the displaced metal. However, this type of locking means requires considerable torque or force to drive the male member into the female member due to interference and displacement of metal that occurs. If the tolerances of the members are not held within certain limitations, so much interference may occur that the threads on one or both of the members may strip or the members may fracture or so little interference may occur that no resistance to removal is provided.

Summary

It is, therefore, a primary object of the present invention to provide a male thread form which resists removal under vibratory conditions and which obviates the above indicated objections and disadvantages of prior devices.

Another object of the present invention is to provide a male thread form in which the removal resistance of the thread form increases in proportion to the vibratory stresses applied thereto.

Yet another object of the present invention, is to provide a removal resistant male thread form which may be driven into a female member with a minimum of applied force or torque.

Another object of the present invention is to provide a removal resistant male thread form which may be readily fabricated at low cost in accordance with customary thread rolling and thread cutting practice and which moreover results in an extremely high degree of locking efficiency while permitting great flexibility in adaptation and use.

Still another object of the present invention is to provide a male thread form which resists removal under conditions of repeated shocks or vibrations and which is adapted for use in conjunction with a female member having a receiving thread of standard design without need for maintaining close tolerances.

Other objects and advantages will appear hereinafter as this disclosure progresses, reference being had to the accompanying drawings, in which:

FIGURE 1 is a side view of a male member containing the thread form of the present invention;

FIGURE 2 is an enlarged fragmentary view of the male member shown in FIGURE 1;

FIGURE 3 is a section through a female member or receiver showing the male member of FIGURE 1 immediately following insertion; and FIGURE 4 is a similar section through the female member with the male member of FIGURE 2 inserted therein but showing the same after having been subjected to motor vibration or the like.

Detailed description

Referring now to the drawing, there is shown therein a male member 10 having the thread form of the present invention. Member 10 includes roots 12 and crests 14 of a thread form having uniform axial pitch on the member. The included angle of these crest and root formations may conform to any standard specifications such as Unified, National Fine, National Coarse, Metric, or Whitworth which define the included angle of the roots and crests, the pitch, and other features of the thread form.

In the initial convolution or convolutions 16 of the improved male thread form, the roots 12 and crests 14 are of the standard diameter prescribed by the specification for the thread form to which the invention is applied. These convolutions 16 in the initial zone of the thread form serve to engage male member 10 in the receiver or female member 40 and at least one complete convolution is required for this purpose.

The subsequent convolution or convolutions 18 of the thread form which provide the second zone contain crests 14 of standard size, diameter and shape and roots 20 of progressively increasing diameter. It will be appreciated that to maintain the standard diameter and included angle of crests 14 in this zone, the roots 20 become flattened upon increasing their diameter. The amount of increase in the diameter of roots 20 is such that at the end of convolutions 18, the root 20 is in interference with the crests of the female member or receiver when the male member 10 is inserted therein. The amount of this interference is described hereinafter in greater detail, but in keeping with the easy insertion characteristics of the thread form, the intereference may be stated generally as being of a small amount. The number of convolutions 18 required in the second zone depends on the amount of interference with the female crests provided at the termination of the convolutions. Generally, one to three convolutions are sufficient and the greater the amount of interference desired, the greater the number of convolutions required.

The remainder of the convolutions 22 of the thread form, which generally provide a third zone, contain roots 21 of the increased root diameter present at the termination of convolutions 18 in the preceding zone. Also, in the zone formed by the convolutions 22, the diameter of the crests of convolutions 22 periodically decreases to a minimum diameter and increases to the prescribed diameter axially along male member 10, as shown in detail in FIGURE 2. Specifically, crest 24 of convolution 22a is of the prescribed diameter called for by the thread form specification and resembles crests 14. Crest 26 of the next successive convolution 22b is of a slightly decreased diameter, thus formed by removing a portion of the apex of the thread. Crest 28 of the next convolution 22c is of lesser diameter than crest 26 as a greater portion of the apex of the crest is removed. Crest 30 of convolution 22d is of the smallest or minimum diameter of any of the crests of convolutions 22 in the third zone by reason of the removal of still a larger portion of the apex of the crest.

In the next three convolutions 22e, 22f, and 22g of the thread form, the crest diameter of the threads progressively increases by amounts corresponding to the crest diameter of crests 28, 26 and 24 of the convolutions 22c, 22b, and 22a, respectively, so that convolution 22g again includes a crest 24 of the standard diameter prescribed in the thread form specification.

The crests of the convolutions just described thus start with one standard diameter, decrease through a number of convolutions to one of substantially lessened diameter and then increase back to one of standard diameter through an additional number of convolutions. The crests of convolutions 22 may thus be considered to take on a "sine wave" shape due to their periodic decrease and increase back to normal along the axial length of male member 10. The number of convolutions required to complete one such decrease in diameter and return to standard diameter depends upon the size of the male member, pitch of the thread form, and amount of removal resistance or locking desired, but there should be a minimum of four complete sine wave variations per inch of axial length of the thread form. As shown, the preferred embodiment of the invention incorporates six variations per inch. The overall number of convolutions 22 employed on male member 10 depends upon the application of the member.

In operation, the male member 10 is placed in axial alignment with a female member or receiver, such as the receiver 40 shown in FIGURE 3. Male member 10 is then driven into the female member, the roots 12 and crests 14 of convolutions 16 mating with roots 34 and crests 36 of the receiving member 40 to engage the male member 10 in the female member. As male member 10 is inserted further in the female member, the increased diameter root 20 of convolutions 18 comes into interference with crests 36 of the receiver to a progressively greater extent, and the slight friction produced thereby secures the male member 10 in the female member 40 and frictionally resists removal therefrom. This interference between increased diameter roots 21 and crests 36 continues as convolutions 22 enter female member 40 and the male member is completely inserted in the female member.

As shown in FIGURE 3, when the male member 10 is completely inserted in the female member 40, voids 38 will appear in the roots 34 of the female member 40 due to the removal of the apex of crests 26, 28 and 30 of male member 10. These voids range from minor in the root 34 mating with crest 26 to major in the root 34 mating with crest 30.

Thereafter, as the male member 10 is initially subjected to vibration, it is retained in female member 40 by reason of the friction between the increased diameter roots 21 and the crests 34 of the female member. However, as the vibration continues, the metal of female member 40 in the vicinity of the threadform cold flows or creeps into the voids 38 formed by crests 26, 28 and 30 of male member 10. This causes the root diameter of roots 34 mating with these crests to expand so that female member 40 conforms approximately to the shape of male member 10 as shown in FIGURE 4.

After the metal of female member 40 has cold flowed completely or even partially around male member 10, the male member is effectively locked in female member 40 due to the interference between the filled voids 38 and the standard diameter crests 24 and 14. Furthermore, the more vibration applied to the members, the more complete is the cold flow of the material of the female member 40 about the male member 10 and the greater the resistance to removal of the male member 10.

As a general rule, as the amount of interference between the diameter root 20, 21 and the crests 36 of the female member 40 is increased, a greater decrease may be provided in the diameter of each of crests 26, 28 and 30 since the additional friction between the roots 20, 21 and crests 36 more securely retains the male member 10 in female member 40 and thus permits a greater amount of cold flowing of female member 40. For the same reason, as the amount of interference between increased diameter root 20, 21 and female member crests 36 increases, the number of sine wave variations per unit of axial length may be increased. Although additional voids are created by an increase in the number of variations per unit of axial length, the additional friction between increased diameter root 20, 21 and female member crests 36 permits these voids to be filled by the cold flowing of member 40 without danger of male member 10 loosening in the interim.

An increase in both the number and size of voids 38 will increase the removal resistance of the thread form as the interference between the filled in voids 38 and standard diameter crests 14 and 24 upon attempted removal will be increased.

Using the accepted American Standard definition for the term "pitch diameter" as the diameter of the imaginary coaxial cylinder, the surface of which would pass through the thread profiles at such points as to make the width of the groove equal to one-half of the basic pitch, the crest diameter of the male thread embodying the "sine wave" pattern of the present invention should range between the maximum diameter 24 and a minimum diameter at 30 at no less than the defined pitch diameter.

The invention has been placed in actual commercial use, and the improved thread form has proven extremely efficient. The attachment devices embodying the thread form are readily manufactured with the aid of standard equipment, and an effective locking action is obtained without the need to resort to special locking devices. While attachment devices embodying the improved thread form have found advantageous use especially in connection with gasoline motors and the like, there are obviously numerous additional applications for these devices wherever a large amount of vibration occurs.

Various modes of carrying out the invention are contemplated as being within the scope of the following claims particularly pointing out and distinctly claiming the subject matter that is regarded as the invention.

I claim:
1. In a device for reception in a threaded female member having a standard thread form, a male thread having uniform axial pitch throughout its length, at least the initial complete convolution of the root being substantially V-shaped in cross section, the root being progressively flattened beyond said initial complete convolution to a uniform increased diameter which remains constant throughout subsequent convolutions, the crest diameter throughout at least the initial complete convolution of the thread form also being V-shaped in cross section with the maximum crest diameter being defined thereby, and the crest diameter of said subsequent convolutions of the thread form being of periodically progressively decreasing diameter over at least one complete convolution thereof to a predetermined minimum and progressively increasing diameter over at least one complete convolution thereof to a defined maximum along the length of said thread form.

2. A device according to claim 1, wherein the areas of periodic decrease and increase in the diameter of the crest are at least four per lineal inch of axial length of the thread form.

3. A device according to claim 1, wherein the periodic decreases and increases in the crest diameter form a sine wave pattern providing periodic voids upon insertion of the device in the female member, whereby vibration causes the material of the female member adjacent the voids to flow and substantially fill the same.

4. A device according to claim 3, wherein the amount of increase in the root diameter is directly proportional to the amount of periodic decrease of the crest diameter.

5. A device according to claim 1, wherein the increase in root diameter is proportional to the number of periodic decreases in crest diameter for a given length.

6. A male thread form having a uniform axial pitch and comprised of three axial zones along its length, the first zone extending through at least the initial complete convolution of the root thereof, said root being substantially V-shaped in cross section and having the maximum crest diameter of the thread form defined in said first zone, the second zone including subsequent convolutions of the root, said root being flattened in said second zone to a progressively increasing diameter, the crest diameter in said first and second zones being substantially identical, and a third zone including the convolutions of the root subsequent to the second zone, having a constant flattened root diameter corresponding to the diameter of the root at the termination of the second zone, and having a periodically axially decreasing and increasing crest diameter, the crest diameter in said third zone decreasing over a plurality of convolutions to the minimum and then increasing over a plurality of convolutions to the defined maximum.

References Cited

UNITED STATES PATENTS

| | | | |
|---|---|---|---|
| 2,135,637 | 11/1938 | Gode | 151—22 |
| 2,269,476 | 1/1942 | Poupitch | 151—14 |
| 2,437,638 | 3/1948 | Evans | 151—14 |
| 2,873,641 | 2/1959 | Evans | 151—22 |
| 3,200,691 | 8/1965 | Neushotz | 85—47 |
| 3,279,519 | 10/1966 | Neushotz | 151—41.73 |
| 3,301,299 | 1/1967 | Stanwick | 151—22 |

EDWARD C. ALLEN, *Primary Examiner.*